(12) United States Patent
Yamamoto

(10) Patent No.: US 8,512,500 B2
(45) Date of Patent: Aug. 20, 2013

(54) MANUFACTURING METHOD OF OPTICAL WAVEGUIDE

(75) Inventor: Kazunao Yamamoto, Nagano (JP)

(73) Assignee: Shinko Electric Industries Co., Ltd., Nagano-shi, Nagano (JP)

( * ) Notice: Subject to any disclaimer, the term of this patent is extended or adjusted under 35 U.S.C. 154(b) by 334 days.

(21) Appl. No.: 12/360,284

(22) Filed: Jan. 27, 2009

(65) Prior Publication Data
US 2009/0188610 A1    Jul. 30, 2009

(30) Foreign Application Priority Data

Jan. 29, 2008    (JP) ................. 2008-017681

(51) Int. Cl.
*G02B 6/138*    (2006.01)
*G02B 6/10*    (2006.01)

(52) U.S. Cl.
USPC ..... 156/242; 156/245; 156/273.7; 156/275.7; 264/1.27; 264/1.36; 264/1.7; 385/131

(58) Field of Classification Search
USPC ............. 264/1.9, 1.24, 1.27, 1.36, 1.38, 1.29, 264/1.7; 156/242, 273.7, 275.7; 385/129, 385/130, 131, 132
See application file for complete search history.

(56) References Cited

U.S. PATENT DOCUMENTS

| | | | | |
|---|---|---|---|---|
| 6,355,198 | B1 * | 3/2002 | Kim et al. | 264/259 |
| 6,968,109 | B2 * | 11/2005 | Furuyama | 385/129 |
| 7,050,691 | B2 * | 5/2006 | Ishizaki et al. | 385/132 |
| 2004/0057683 | A1 * | 3/2004 | Shimizu et al. | 385/123 |
| 2004/0062506 | A1 * | 4/2004 | Komura et al. | 385/131 |
| 2005/0158003 | A1 * | 7/2005 | Ohtsu et al. | 385/129 |
| 2005/0201686 | A1 * | 9/2005 | Cole et al. | 385/40 |
| 2006/0177188 | A1 * | 8/2006 | Ishizaki et al. | 385/132 |
| 2006/0275004 | A1 * | 12/2006 | Fujii et al. | 385/129 |

FOREIGN PATENT DOCUMENTS

JP    2006-139119    6/2006

* cited by examiner

*Primary Examiner* — William Bell
(74) *Attorney, Agent, or Firm* — Drinker Biddle & Reath LLP

(57) ABSTRACT

In a method of manufacturing an optical waveguide using a flat die having a groove therein, the method includes: (a) forming a first cladding sheet on a base substrate; (b) placing the first cladding sheet and the base substrate on the flat die such that the first cladding sheet faces the groove of the flat die; (c) filling the groove with a liquid resin and then curing the liquid resin, thereby forming a mirror support on the first cladding sheet; (d) removing the flat die from the first cladding sheet; (e) forming a metal reflection film on the mirror support; (f) forming a core sheet on the first cladding sheet such that the core sheet covers the mirror support that is formed with the metal reflection film; (g) forming a second cladding sheet on the core sheet; and (h) removing the base substrate from the first cladding sheet.

8 Claims, 17 Drawing Sheets

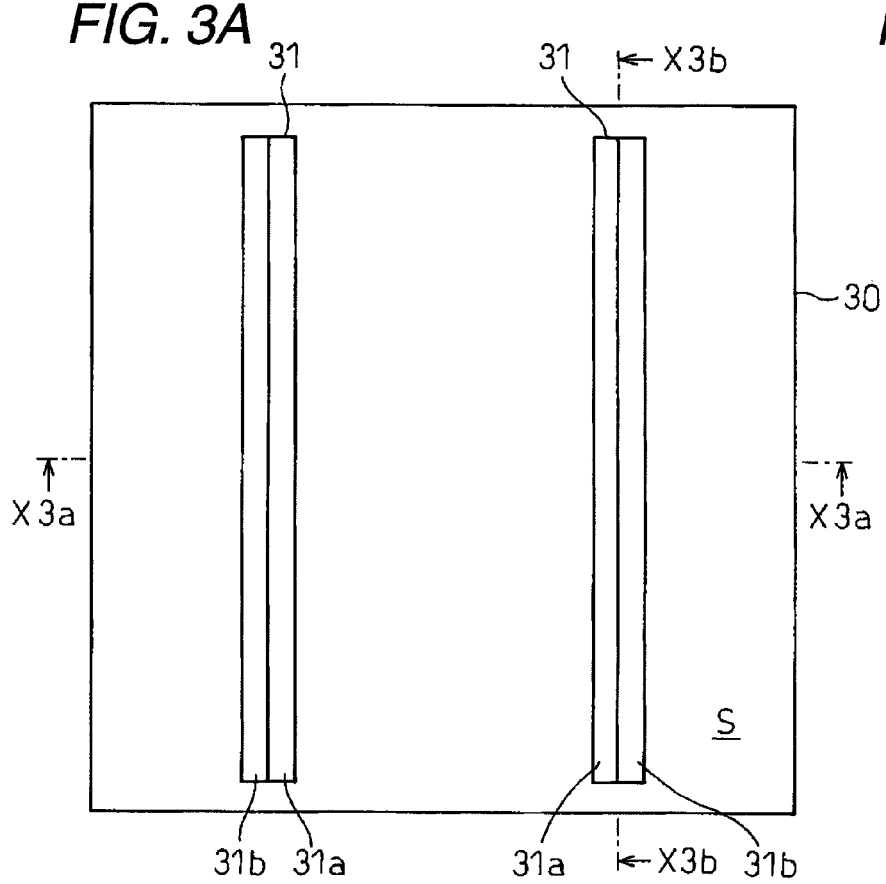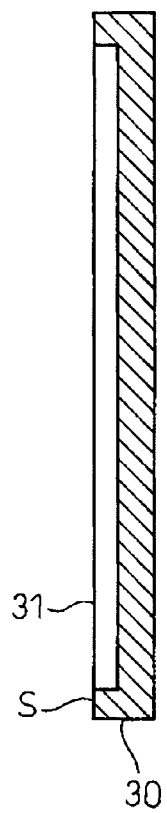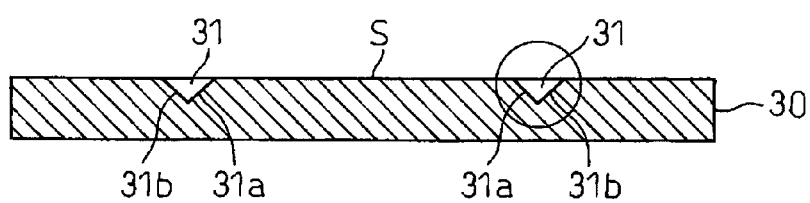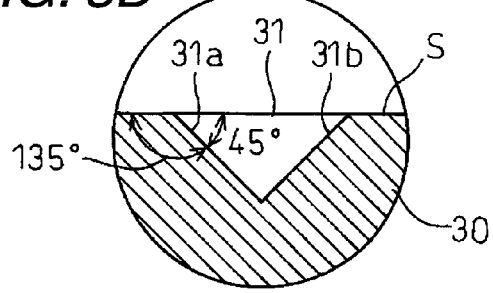

FIG. 4A
FIG. 4C
FIG. 4B
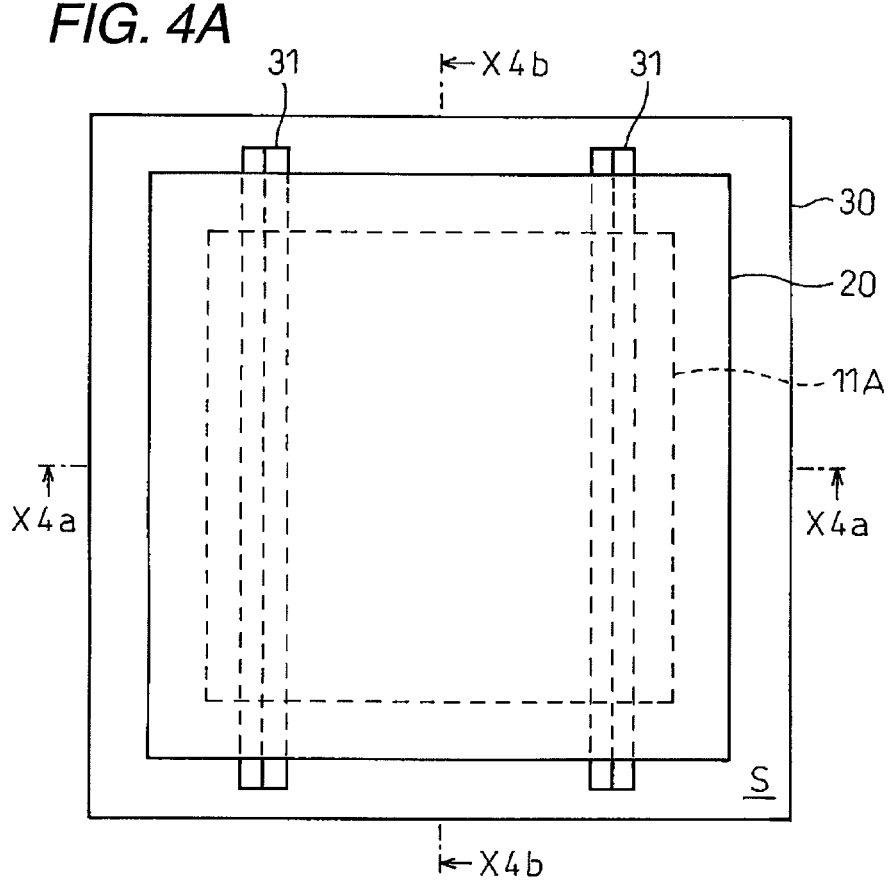
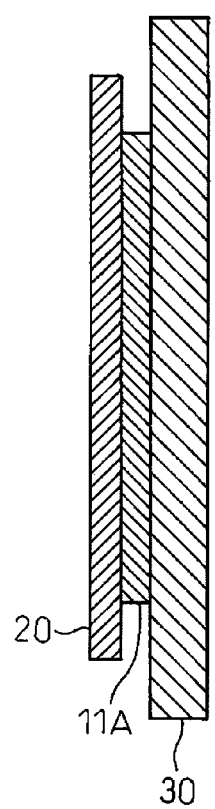
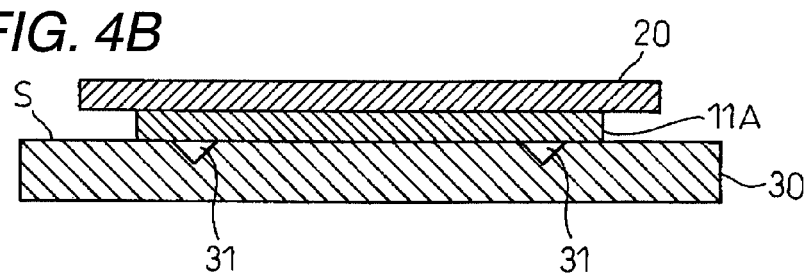

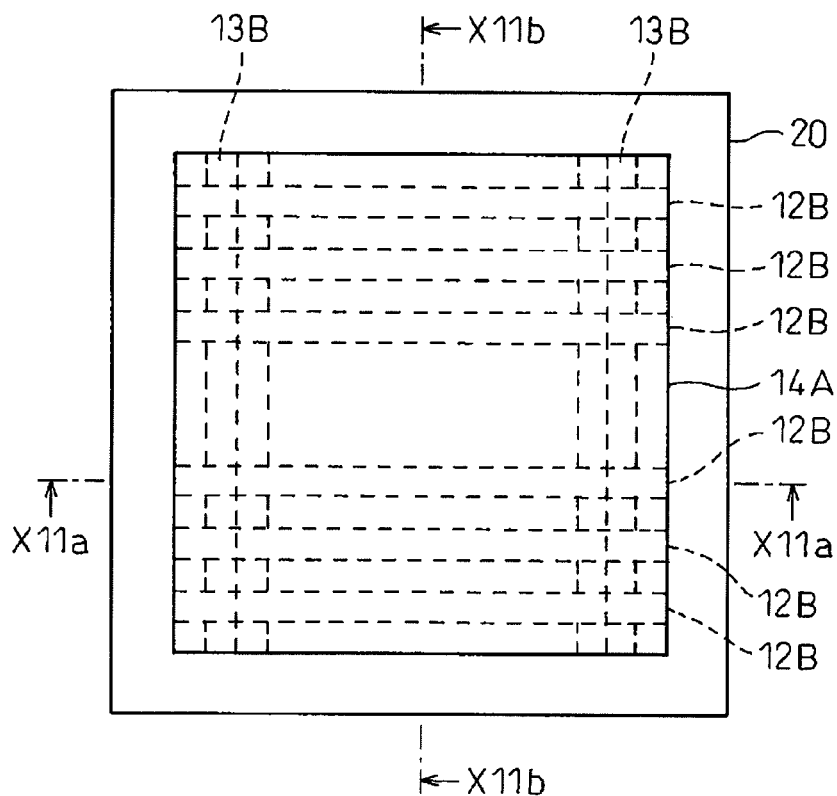
FIG. 11A
FIG. 11B
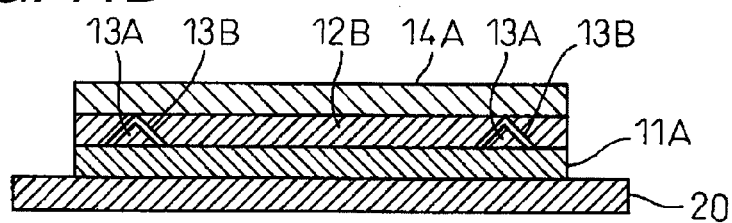
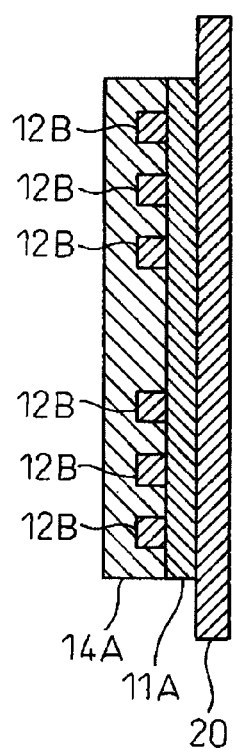
FIG. 11C

MANUFACTURING METHOD OF OPTICAL WAVEGUIDE

This application is based on and claims priority from Japanese Patent Application No. 2008-017681, filed on Jan. 29, 2008, the entire contents of which are hereby incorporated by reference.

BACKGROUND

1. Technical Field

The present disclosure relates to a manufacturing method of an optical waveguide.

2. Related Art

With the increase in the speed (frequency) of the signal transmission, various electronic circuits have come to employ optical/electrical hybrid circuits where conductive interconnections of copper or the like are replaced with optical interconnections using optical waveguides in part of the circuit.

In optical/electrical hybrid circuits of this type, a light-emitting element such as a vertical cavity surface emitting laser (VCSEL) and a light-receiving element such as a photodiode (PD) are mounted on a circuit board and light that is emitted from the light-emitting element is transmitted to the light-receiving element via an optical waveguide.

In optical/electrical hybrid circuits, light that is emitted from the light-emitting element perpendicularly toward the circuit board is reflected by a mirror portion that forms an angle 45° with respect to the light traveling direction so as to travel in parallel with the circuit board (the traveling direction is changed by 90°) and thereby travels through the optical waveguide.

For example, JP-A-2006-139119 describes a method for manufacturing an optical waveguide having the above-mentioned mirror portion using a die. In this manufacturing method, the mirror portion and a core layer for propagating light are formed by using a die. More specifically, the mirror portion and the core layer are formed by filling grooves of the die with liquid ultraviolet-setting resin and then irradiating the resin with ultraviolet light.

However, in the manufacturing method disclosed in JP-A-2006-139119, when the grooves of the die are filled with liquid ultraviolet-setting resin, the resin overflows the grooves and is set in the overflowed state. It is therefore necessary to remove the overflowed parts of the resin. Furthermore, the manufacturing process as a whole of an optical waveguide is complex because the core layer and cladding layers that surround the core layer are produced by different manufacturing methods, that is, whereas the core layer is formed by using the die, the cladding layers are formed by laminating resin sheets. Still further, the die is formed with the grooves having complex shapes for forming the mirror portion and the core layer, respectively, and hence it is difficult to produce such a die with high dimensional accuracy. Moreover, there is possibility that liquid ultraviolet-setting resin does not reach every corner of the grooves having certain shapes and dimensions.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, an aspect of the present invention is to provide a manufacturing method of an optical waveguide which can facilitate the manufacturing and reduce the manufacturing cost. Another aspect of the present invention is to provide a manufacturing method of an optical waveguide which can form a mirror portion having a desired shape with high accuracy.

According to one or more aspects of the present invention, there is provided a method of manufacturing an optical waveguide using a flat die having a groove therein. The method includes: (a) forming a first cladding sheet on a base substrate; (b) placing the first cladding sheet and the base substrate on the flat die such that the first cladding sheet faces the groove of the flat die; (c) filling the groove with a liquid resin and then curing the liquid resin while pressing the base substrate against the flat die via the first cladding sheet, thereby forming a mirror support on the first cladding sheet; (d) removing the flat die from the first cladding sheet; (e) forming a metal reflection film on a surface of the mirror support; (f) forming a core sheet on the first cladding sheet such that the core sheet covers the mirror support that is formed with the metal reflection film; (g) forming a second cladding sheet on the core sheet; and (h) removing the base substrate from the first cladding sheet.

According to one or more aspects of the present invention, in step (c), the groove is filled with the liquid resin by capillary action.

According to one or more aspects of the present invention, there is provided a method of manufacturing an optical waveguide using a flat die having a groove therein. The method includes: (a) forming a first cladding sheet on a base substrate; (b) placing the first cladding sheet and the base substrate on the flat die such that the first cladding sheet faces the groove of the flat die; (c) filling the groove with a liquid resin and then curing the liquid resin while pressing the base substrate against the flat die via the first cladding sheet, thereby forming a mirror support on the first cladding sheet; (d) removing the flat die from the first cladding sheet; (e) forming a metal reflection film on a surface of the mirror support; (f) forming a core sheet on the first cladding sheet such that the core sheet covers the mirror support that is formed with the metal reflection film; (g) patterning the core sheet to form a plurality of core portions, the plurality of core portions being spaced from each other and being perpendicular to the mirror support; (h) covering the core portions with a second cladding sheet; (i) removing the base substrate from the first cladding sheet, thereby producing an optical waveguide bundle that includes the first cladding sheet, the plurality of core portions, the mirror support and the second cladding sheet; and (j) cutting the optical waveguide bundle into individual optical waveguides each including a part of the mirror support and at least one of the core portions.

According to one or more aspects of the present invention, the flat die is made of stainless steel.

According to one or more aspects of the present invention, the liquid resin is a light-curing resin or a thermosetting resin.

According to one or more aspects of the present invention, there is provided a method of manufacturing an optical waveguide using a flat die having a groove therein. The method includes: (a) placing a base substrate on the flat die such that the base substrate faces the groove of the flat die; (b) filling the groove with a liquid resin and then curing the liquid resin while pressing the base substrate against the flat die, thereby forming a mirror support on the base substrate; (c) removing the flat die from the base substrate; (d) forming a metal reflection film on a surface of the mirror support; (e) forming a core sheet on the base substrate such that the core sheet covers the mirror support that is formed with the metal reflection film; (f) forming a first cladding sheet on the core sheet; (g) removing the base substrate from the core sheet, thereby producing a core sheet composite structure that includes the first cladding sheet, the core sheet, the mirror support; and (h) bonding the core sheet composite structure onto a circuit board via a second cladding sheet such that the core sheet faces the second cladding sheet.

Other aspects and advantages of the invention will be apparent from the following description, the drawings and the claims.

BRIEF DESCRIPTION OF THE DRAWINGS

FIGS. 1A to 1C show an optical waveguide which is manufactured by a manufacturing method of an optical waveguide according to a first embodiment of the present invention, wherein FIG. 1A is a plan view, FIG. 1B is a sectional view taken along line X1a-X1a in FIG. 1A, and FIG. 1C is a sectional view taken along line X1b-X1b in FIG. 1A.

FIGS. 2A to 2C show one manufacturing process of the optical waveguide according to the first embodiment of the present invention, wherein FIG. 2A is a plan view, FIG. 2B is a sectional view taken along line X2a-X2a in FIG. 2A, and FIG. 2C is a sectional view taken along line X2b-X2b in FIG. 2A.

FIGS. 3A to 3C show one manufacturing step of the optical waveguide according to the first embodiment of the present invention, wherein FIG. 3A is a plan view, FIG. 3B is a sectional view taken along line X3a-X3a in FIG. 3A, FIG. 3C is a sectional view taken along line X3b-X3b in FIG. 3A, and FIG. 3D is an enlarged view of part of FIG. 3A.

FIGS. 4A to 4C show one manufacturing process of the optical waveguide according to the first embodiment of the present invention, wherein FIG. 4A is a plan view, FIG. 4B is a sectional view taken along line X4a-X4a in FIG. 4A, and FIG. 4C is a sectional view taken along line X4b-X4b in FIG. 4A.

FIGS. 5A to 5C show one manufacturing process of the optical waveguide according to the first embodiment of the present invention, wherein FIG. 5A is a plan view, FIG. 5B is a sectional view taken along line X5a-X5a in FIG. 5A, and FIG. 5C is a sectional view taken along line X5b-X5b in FIG. 5A.

FIGS. 6A to 6C show one manufacturing process of the optical waveguide according to the first embodiment of the present invention, wherein FIG. 6A is a plan view, FIG. 6B is a sectional view taken along line X6a-X6a in FIG. 6A, and FIG. 6C is a sectional view taken along line X6b-X6b in FIG. 6A.

FIGS. 7A to 7C show one manufacturing process of the optical waveguide according to the first embodiment of the present invention, wherein FIG. 7A is a plan view, FIG. 7B is a sectional view taken along line X7a-X7a in FIG. 7A, and FIG. 7C is a sectional view taken along line X7b-X7b in FIG. 7A.

FIGS. 8A to 8C show one manufacturing process of the optical waveguide according to the first embodiment of the present invention, wherein FIG. 8A is a plan view, FIG. 8B is a sectional view taken along line X8a-X8a in FIG. 8A, and FIG. 8C is a sectional view taken along line X8b-X8b in FIG. 8A.

FIGS. 9A to 9C show one manufacturing process of the optical waveguide according to the first embodiment of the present invention, wherein FIG. 9A is a plan view, FIG. 9B is a sectional view taken along line X9a-X9a in FIG. 9A, and FIG. 9C is a sectional view taken along line X9b-X9b in FIG. 9A.

FIGS. 10A to 10C show one manufacturing process of the optical waveguide according to the first embodiment of the present invention, wherein FIG. 10A is a plan view, FIG. 10B is a sectional view taken along line X10a-X10a in FIG. 10A, and FIG. 10C is a sectional view taken along line X10b-X10b in FIG. 10A.

FIGS. 11A to 11C show one manufacturing process of the optical waveguide according to the first embodiment of the present invention, wherein FIG. 11A is a plan view, FIG. 11B is a sectional view taken along line X11a-X11a in FIG. 11A, and FIG. 11C is a sectional view taken along line X11b-X11b in FIG. 11A.

FIGS. 12A to 12C show one manufacturing process of the optical waveguide according to the first embodiment of the present invention, wherein FIG. 12A is a plan view, FIG. 12B is a sectional view taken along line X12a-X12a in FIG. 12A, and FIG. 12C is a sectional view taken along line X12b-X12b in FIG. 12A.

FIGS. 13A to 13C shows one manufacturing process of an optical waveguide according to a second embodiment of the present invention, wherein FIG. 13A is a plan view, FIG. 13B is a sectional view taken along line X13a-X13a in FIG. 13A, and FIG. 13C is a sectional view taken along line X13b-X13b in FIG. 13A.

FIGS. 14A to 14C show one manufacturing process of the optical waveguide according to the second embodiment of the present invention, wherein FIG. 14A is a plan view, FIG. 14B is a sectional view taken along line X14a-X14a in FIG. 14A, and FIG. 14C is a sectional view taken along line X14b-X14b in FIG. 14A.

FIGS. 15A to 15C show one manufacturing process of the optical waveguide according to the second embodiment of the present invention, wherein FIG. 15A is a plan view, FIG. 15B is a sectional view taken along line X15a-X15a in FIG. 15A, and FIG. 15C is a sectional view taken along line X15b-X15b in FIG. 15A.

FIGS. 16A and 16B show one manufacturing process of the optical waveguide according to the second embodiment of the present invention, wherein FIG. 16A shows a core sheet composite structure and a circuit board and FIG. 16B shows a state that the core sheet composite structure is bonded to the circuit board.

DETAILED DESCRIPTION OF EXEMPLARY EMBODIMENTS OF THE INVENTION

Exemplary embodiments of the present invention will be now described with reference to the drawings.

Figure 1A:
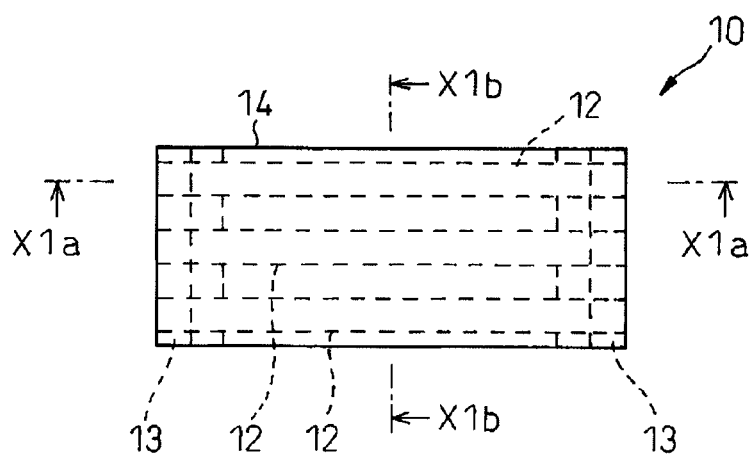
Figure 1C:
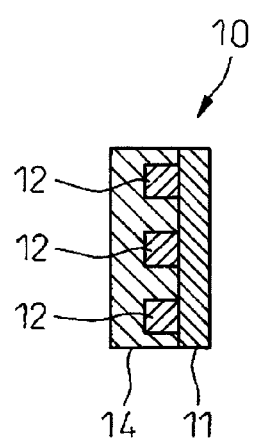
Figure 1B:
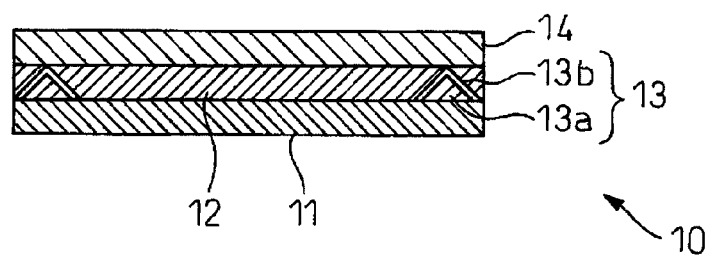

FIGS. 1A-1C show an optical waveguide which is manufactured by a manufacturing method according to an embodiment of the present invention.

As shown in FIGS. 1A-1C, in an optical waveguide 10, long and narrow core layers 12 are sandwiched between a second cladding layer 14 and a first cladding layer 11 and mirror portions 13 are provided at both ends, in the longitudinal direction, of the core layers 12.

The optical waveguide 10 has a rectangular parallelepiped shape as a whole. As shown in FIG. 1A, the second cladding layer 14 and the first cladding layer 11 have the same rectangular plan-view shape. The optical waveguide 10 has three core layers 12 that are provided with the mirror portions 13 at both ends. The three core layers 12 are arranged parallel with each other.

Each core layer 12 has a long and narrow, rectangular parallelepiped shape as a whole. Each core layer 12 has a rectangular shape in a cross section taken perpendicularly to its longitudinal direction. As shown in FIG. 1C, each core layer 12 is surrounded by (sandwiched between) the second cladding layer 14 and the first cladding layer 11 having a smaller refractive index than the core layer 12. One surface of each core layer 12 is in contact with the first cladding layer 11. The other three surfaces of each core layer 12 are in contact with the second cladding layer 14. The second cladding layer 14 and the first cladding layer 11 are in direct contact with each other in areas where no core layer 12 exists. It is advantageous that the second cladding layer 14 and the first cladding layer 11 be made of the same material.

As shown in FIG. 1B, the two mirror portions 13 are formed so as to be optically joined to two respective end portions of each core layer 12. The mirror portions 13 are sandwiched between the second cladding layer 14 and the first cladding layer 11, and are located in the same region in the thickness direction of the optical waveguide 10 (i.e., in the top-bottom direction in FIG. 1B) as the core layers 12.

Each mirror portion 13 is formed in such a manner that a metal reflection film 13b which reflects light is formed on a surface of a mirror support 13a. As shown in FIG. 1B, each mirror portion 13 has an isosceles right triangle in cross section. The two sides having the same length of the isosceles right triangle forms interior angles 45° with respect to the base that is in that surface of the first cladding layer 11 which is in contact with the core layers 12. The apex, around which the isosceles right triangle has the interior angle 90°, is in contact with that surface of the second cladding layer 14 which is in contact with the core layers 12. As such, each mirror portion 13 has a light reflection surface (what is called a 45° surface) which forms 45° with respect to the longitudinal direction of the optical waveguide 10 (i.e., in the right-left direction in FIG. 1B).

The dimensions of the isosceles-right-triangle-shaped cross section of each mirror portion 13 can be designed as appropriate so as to be suitable for use. For example, the base length and the height may be set at 80 μm and 40 μm, respectively. The dimensions of the second cladding layer 14 and the first cladding layer 11 can be designed as appropriate so as to be suitable for use. For example, their thicknesses may be set at 40 μm.

In the optical waveguide 10, one mirror portion 13 reflects light that is emitted from an external light-emitting element (not shown) toward and perpendicularly to a core layer 12 so that traveling direction of the light is changed by 90° and is in parallel with the core layer 12. The light traveling through the core layer 12 is reflected again and changed in traveling direction by 90° by the other mirror portion 13 and exits the core layer 12 in the direction perpendicular to it toward an external light-receiving element (not shown).

It is advantageous that, for example, the optical waveguide 10 be mounted on a circuit board having a light-emitting element and/or a light-receiving element and used for constructing an optical/electrical hybrid circuit.

Next, a manufacturing method of the above-described optical waveguide 10 according to the first preferred embodiment of the present invention will be described with reference to the drawings.

Figure 2A:
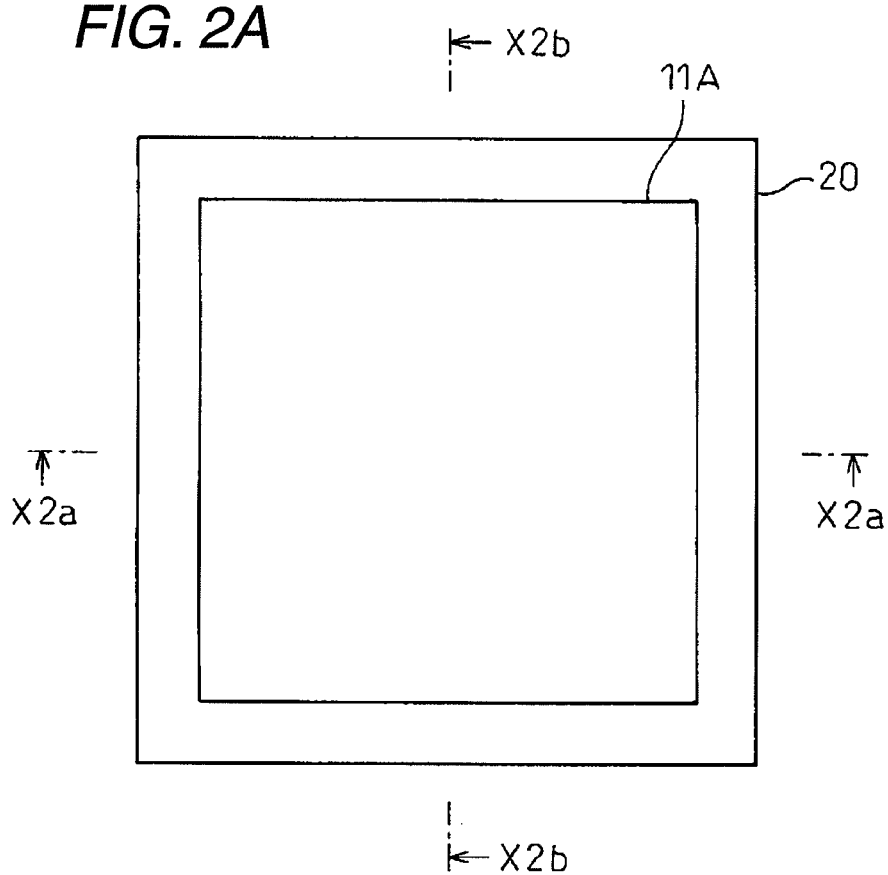
Figure 2C:
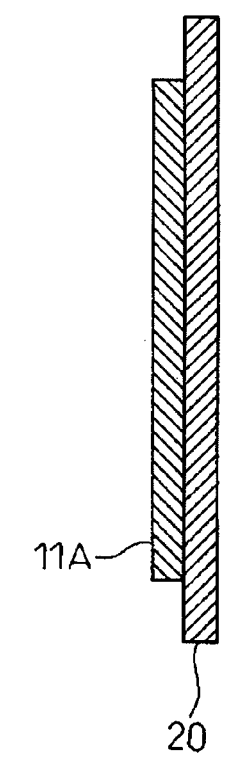
Figure 2B:
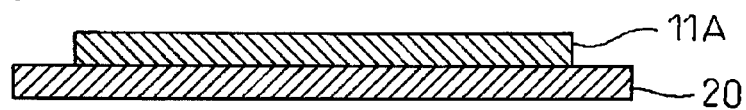

First, as shown in FIGS. 2A-2C, a first cladding sheet 11A is formed on a base substrate 20. The first cladding layer 11 of the optical waveguide 10 will be formed later from the first cladding sheet 11A.

The base substrate 20 may be a resin plate made of acrylic, polycarbonate, PET, or the like. It is advantageous that the base substrate 20 is high in flatness. Where a liquid light-curing resin is used for forming mirror support bundles (described later), it is advantageous that the base substrate 20 be made of a resin that is highly transparent to light that is used in a step of setting the light-curing resin. Where a liquid thermosetting resin is used for forming mirror support bundles (described later), it is advantageous that the base substrate 20 be made of a resin that is resistant to heat that is generated in setting the thermosetting resin.

The first cladding sheet 1A may be made of a light-curing resin such as light-curing acrylic resin, epoxy resin, polyimide resin, or silicon-based resin, an electron-beam-setting resin, or the like. A photodegradable naphthoquinone resin or the like may also be used whose solubility to a solvent is increased when irradiated with an active energy beam.

Alternatively, the first cladding sheet 11A may be made of a thermosetting resin such as a thermosetting epoxy resin, polyimide resin, unsaturated polyester resin, epoxy acrylate resin, or the like. To be flame-retardant or able to absorb an active energy beam, such a resin may contain an addition-type or reaction-type halogen, phosphorus, silicon, or like flame-retardant or ultraviolet absorbent. Among these resins, ones that are highly transparent and flame-retardant are advantageous.

In this embodiment, the first cladding sheet 1A is made of an unset light-curing resin or thermosetting resin and can be sufficiently cured after being formed.

Then, a flat die 30 is prepared. As shown in FIGS. 3A-3C, one surface S of the flat die 30 is formed with a pair of parallel grooves 31. As shown in FIGS. 3B and 3D, in a cross section taken perpendicularly to the longitudinal direction of each groove 31, a portion 31a that is located on the side of the other groove 31 extends straightly toward the bottom away from the other groove 31. As shown in FIGS. 3A-3C, the portion 31a is a long and narrow rectangular surface.

In the above-mentioned cross section, each groove 31 is shaped so as to conform to each mirror support 13a of the optical waveguide 10 shown in FIGS. 1A-1C. That is, each groove 31 assumes an isosceles right triangle in the above-mentioned cross section. In the flat die 30, as shown in FIG. 3D, the portion 31a, located on the side of the other groove 31, of each of the pair of grooves 31 extends straightly toward the bottom and forms an interior angle 135° with respect to the one surface S of the flat die 30. In this embodiment, in each of the pair of grooves 31 of the flat die 30, the portion 31a and the other portion 31b which is opposed to the former are symmetrical.

As described later in detail, the pair of grooves 31 of the flat die 30 will serve to form the mirror supports 13a of the optical waveguide 10 shown in FIGS. 1A-1C. As shown in FIG. 3D, the portion 31a forms an angle 45° with respect to the extension of the plane S. To increase the accuracy of the shape of the mirror portions 13, it is advantageous that the flat die 30 be formed with high dimensional accuracy. In this embodiment, stainless steel is used as a material which allows the flat die 30 to be formed with high dimensional accuracy. That is, the flat die 30 is made of stainless steel. Other materials such as nickel, copper, chromium, zinc, and, silicon may also be used, which are easy to work on.

To facilitate release of mirror support bundles 13A (described later) and a pressure-bonded first cladding layer 11A, it is advantageous that the one surface S of the flat die 30 be coated with a mold release. It is advantageous that at least the pair of grooves 31 of the flat die 30 be coated with a mold release.

Subsequently, as shown in FIGS. 4A-4C, the first cladding sheet 11A which is formed on the base substrate 20 is placed on the one surface S of the flat die 30 so as to cover the pair of grooves 31, and the base substrate 20 is pressed against the fixed flat die 30 via the first cladding sheet 11A so as to eliminate gaps between the surfaces opposed to each other of the first cladding sheet 11A and the flat die 30 except in the areas where the pair of grooves 31 are formed.

As described above, in this embodiment, since the first cladding sheet 11A is made of an unset light-curing resin or thermosetting resin and hence is flexible, gaps between the surfaces opposed to each other of the first cladding sheet 11A and the flat die 30 can be eliminated easily by pressing the base substrate 20.

Figure 5A:
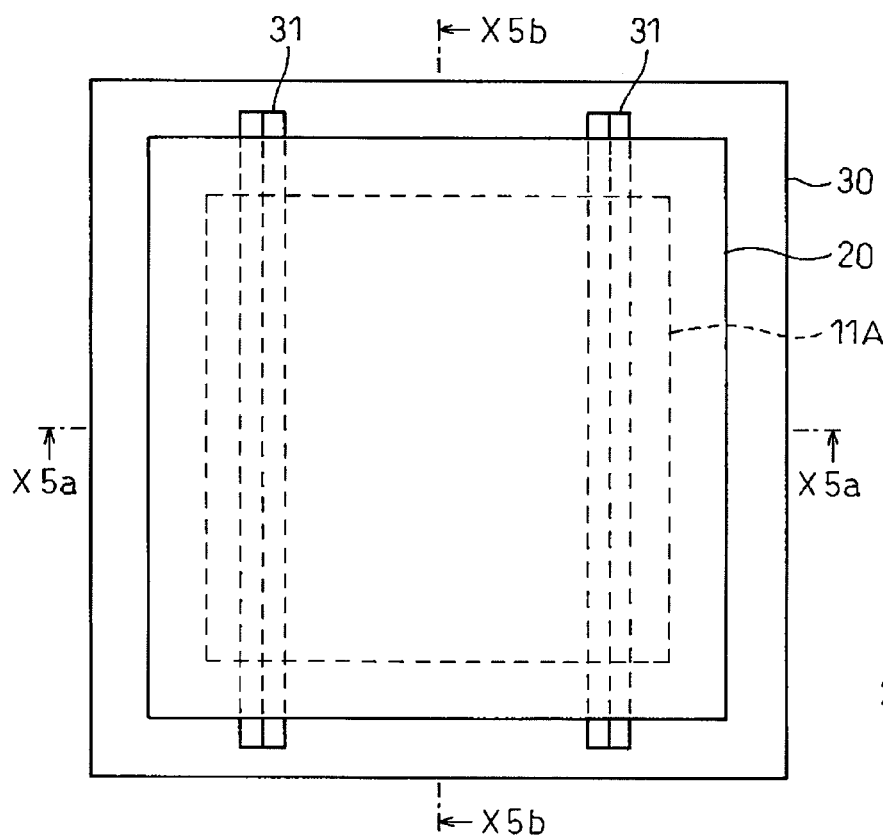
Figure 5C:
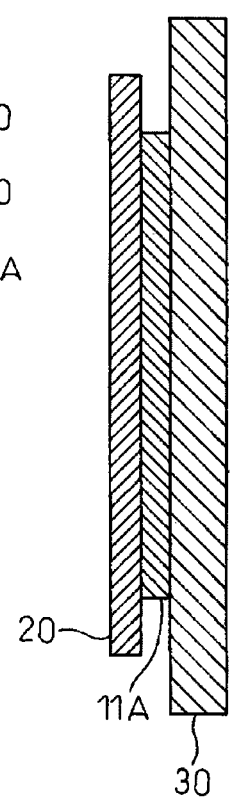
Figure 5B:
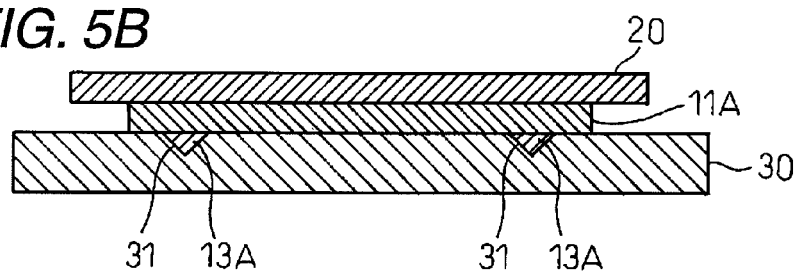

Then, as shown in FIGS. 5A-5C, as the base substrate 20 is pressed against the fixed flat die 30 via the first cladding sheet 11A, each of the pair of grooves 31 is filled with liquid resin, that is, liquid light-curing resin or thermosetting resin, whereby a pair of mirror support bundles 13A are formed on the first cladding sheet 11A.

In this embodiment, each of the pair of grooves 31 is filled with liquid light-curing resin or thermosetting resin by using capillary action. Since each of the pair of grooves 31 is covered with the first cladding sheet 11A and thereby forms a cylindrical space, when liquid light-curing resin or thermosetting resin is filled into the cylindrical space from an end of each of the pair of grooves 31, the resin is allowed to reach every corner of the cylindrical space by capillary action.

Therefore, in this embodiment, it is advantageous that the dimensions of the pair of grooves 31 and material properties such as the surface tension or viscosity of the liquid light-curing resin or thermosetting resin be designed such that the liquid light-curing resin or thermosetting resin can be filled into every corner of the cylindrical space by capillary action.

Where a liquid light-curing resin is used for forming a pair of mirror support bundles 13A, it is advantageous to apply light to the resin from the side of the base substrate 20 which is optical transparent. The irradiated resin is cured to be the pair of mirror support bundles 13A. The pair of mirror supports 13a will be formed from the pair of mirror support bundles 13A. In this manner, a first cladding sheet composite structure 15 is formed which includes the pair of mirror support bundles 13A and the first cladding sheet 11A.

Where a liquid thermosetting resin is used for forming the pair of mirror support bundles 13A, it is advantageous to cure the resin by heating the flat die 30.

To increase the joining strength of the pair of mirror support bundles 13A and the first cladding sheet 11A, it is advantageous that the pair of mirror support bundles 13A and the first cladding sheet 11A be made of the same resin.

Figure 6A:
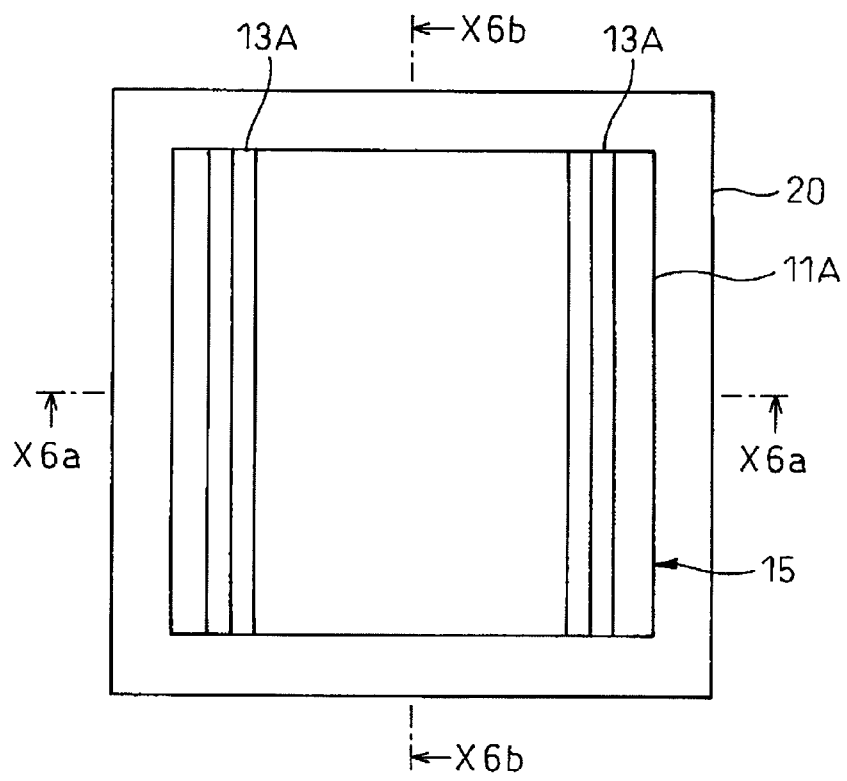
Figure 6C:
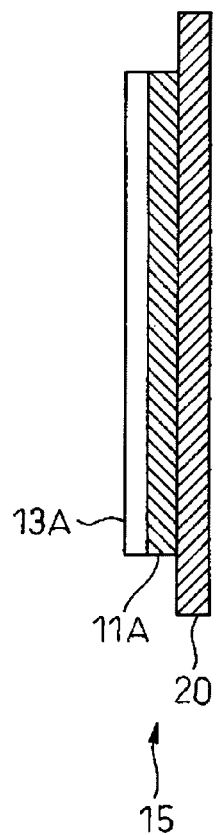
Figure 6B:
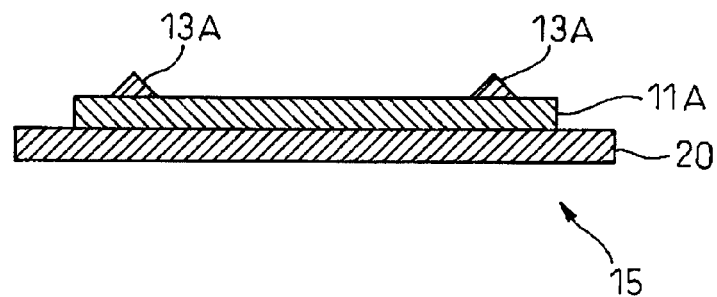

Then, the flat die 30 is removed from the first cladding sheet composite structure 15 and the pair of mirror support bundles 13A. As shown in FIGS. 6A-6C, the first cladding sheet composite structure 15 is such that the pair of mirror support bundles 13A are formed on the first cladding sheet 11A. Each mirror support bundle 13A is long and narrow and extends from one end to the other end of the first cladding sheet 11A.

As shown in FIG. 6B, in cross section, each of the pair of mirror support bundles 13A assumes an isosceles triangle whose basic angles are 45°. Since the portions, having the same length, of each of the pair of mirror support bundles 13A are formed by the portions 31a and 31b of the corresponding groove of the flat die 30, respectively, they are flat surfaces like the portions 31a and 31b.

Figure 7A:
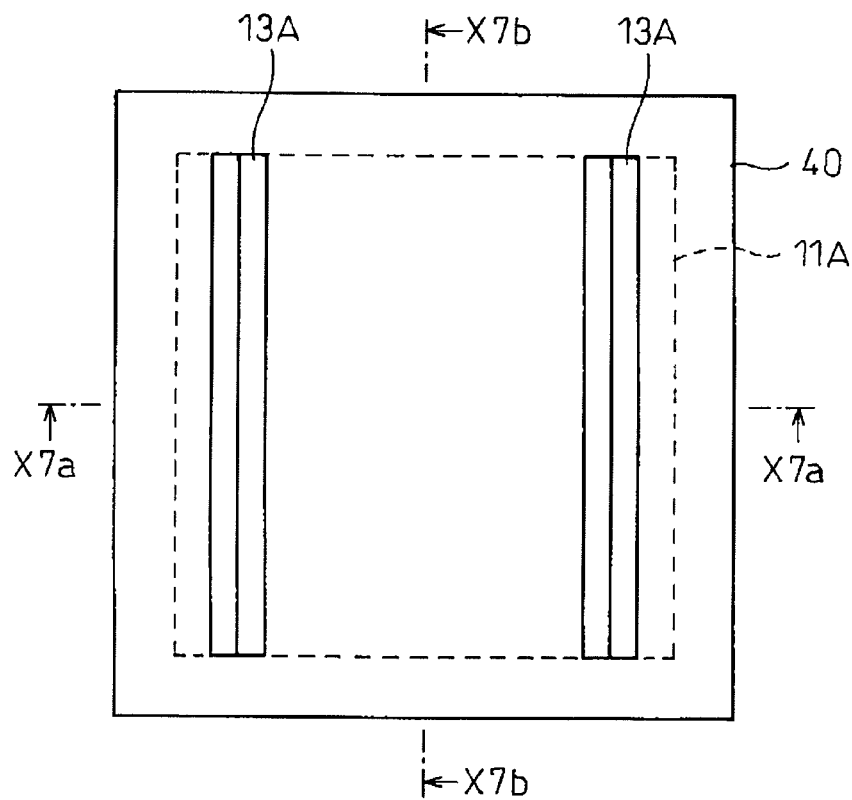
Figure 7C:
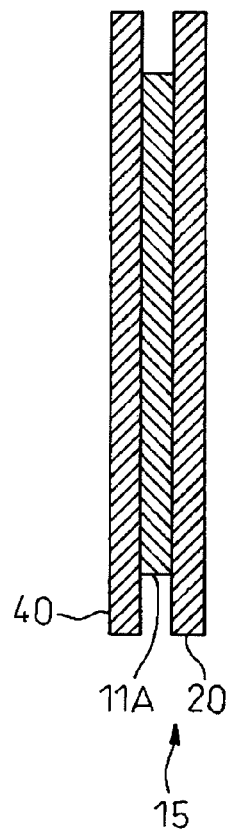
Figure 7B:
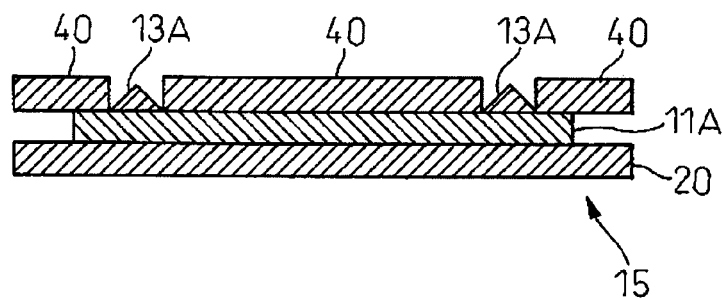

Then, as shown in FIGS. 7A-7C, a mask 40 is placed on the first cladding sheet composite structure 15 so as to cover the first cladding sheet 11A while only the pair of mirror support bundles 13A are exposed. The mask 40 may be a metal mask made of stainless steel, for example.

Figure 8A:
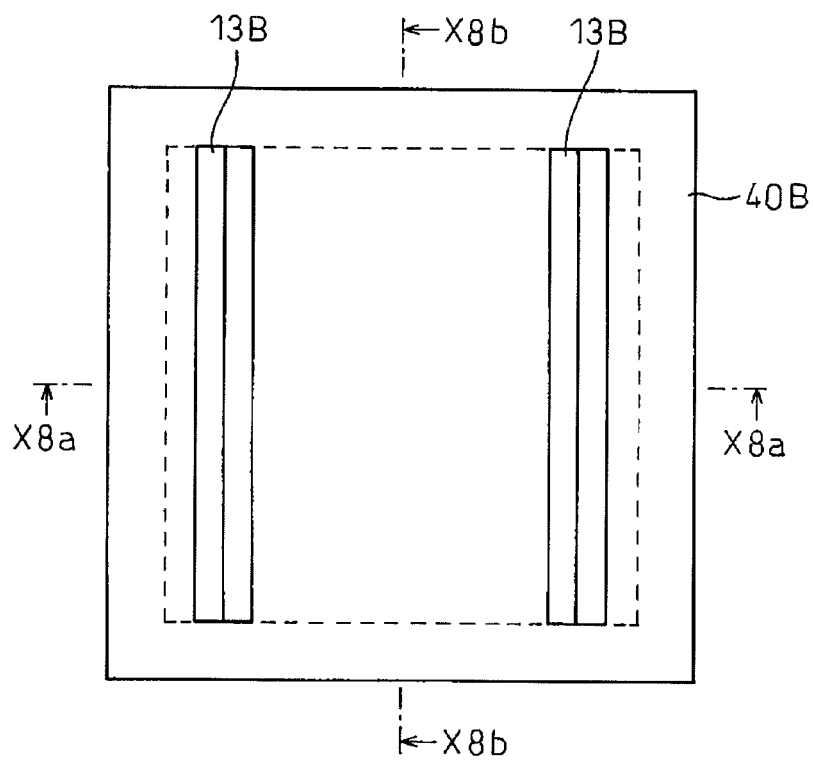
Figure 8C:
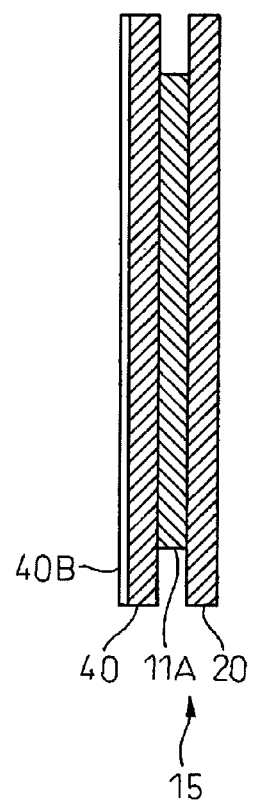
Figure 8B:
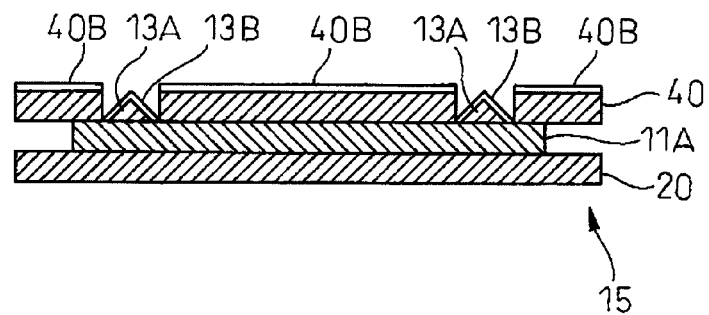

Then, as shown in FIGS. 8A-8C, a metal reflection film is formed on the pair of mirror support bundles 13A of the first cladding sheet composite structure 15, whereby a pair of metal reflection bundles 13B are formed. The pair of mirror portions 13 of the optical waveguide 10 will be formed from the pair of mirror support bundles 13A formed with the metal reflection bundles 13B. The metal reflection bundles 13B may be formed by a known method such as sputtering of gold, for example. As shown in FIG. 8B, whereas a metal reflection film 40B is formed on the mask 40, no metal reflection film is formed on the first cladding sheet 11A which is covered with the mask 40.

As shown in FIG. 8B, the metal reflection bundle 13B is formed on the surfaces of each mirror support bundle 13A which assumes an isosceles right triangle in cross section, and forms angles 45° with respect to the top surface of the first cladding sheet 11A. The metal reflection portions 13b of the mirror portions 13 will be formed from the metal reflection bundles 13B. The portions, having the same length, of each of the mirror support bundle 13A are flat surfaces.

Figure 9A:
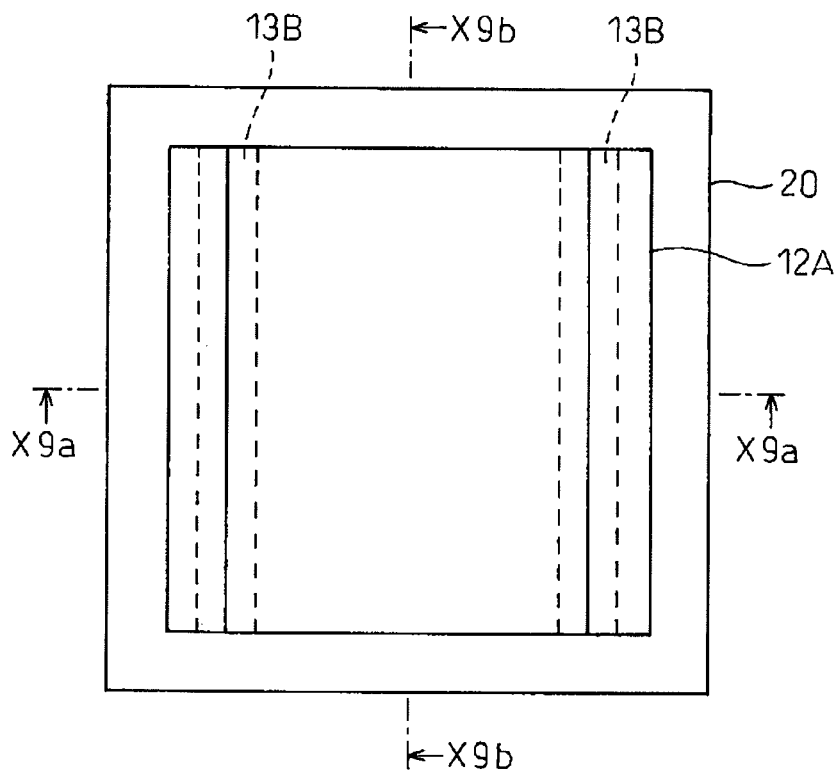
Figure 9C:
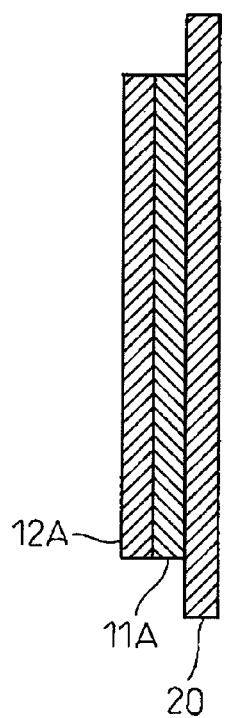
Figure 9B:
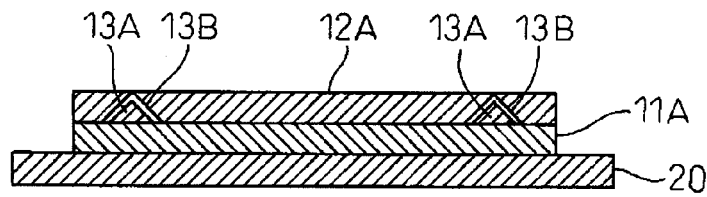

Then, as shown in FIGS. 9A-9C, a core sheet 12A is formed on the first cladding sheet composite structure 15 so as to cover the pair of mirror support bundle 13A. The core sheet 12A will be patterned to be the core layers 12 of the optical waveguide 10. Parts of the core sheet 12A are formed close to the top surfaces of the pair of metal reflection bundles 13B without gaps. In this embodiment, the core sheet 12A is formed so as to cover the entire first cladding sheet 11A.

The parts of the core sheet 12A covers pair of metal reflection bundles 13B by a lamination method such as a vacuum lamination method, and the core sheet 12A is flattened so as to have the same height as the pair of metal reflection bundles 13B. In this embodiment, it is advantageous that the core sheet 12A be made of an unset light-curing resin or thermosetting resin having a certain degree of plasticity. The core sheet 12A is flattened so as to have the same height as the pair of metal reflection bundles 13B and will be sufficiently cured after being patterned (described later).

The material of the core sheet 12A may be the same as that of the first cladding sheet 11A except for a difference in refractive index.

Figure 10A:
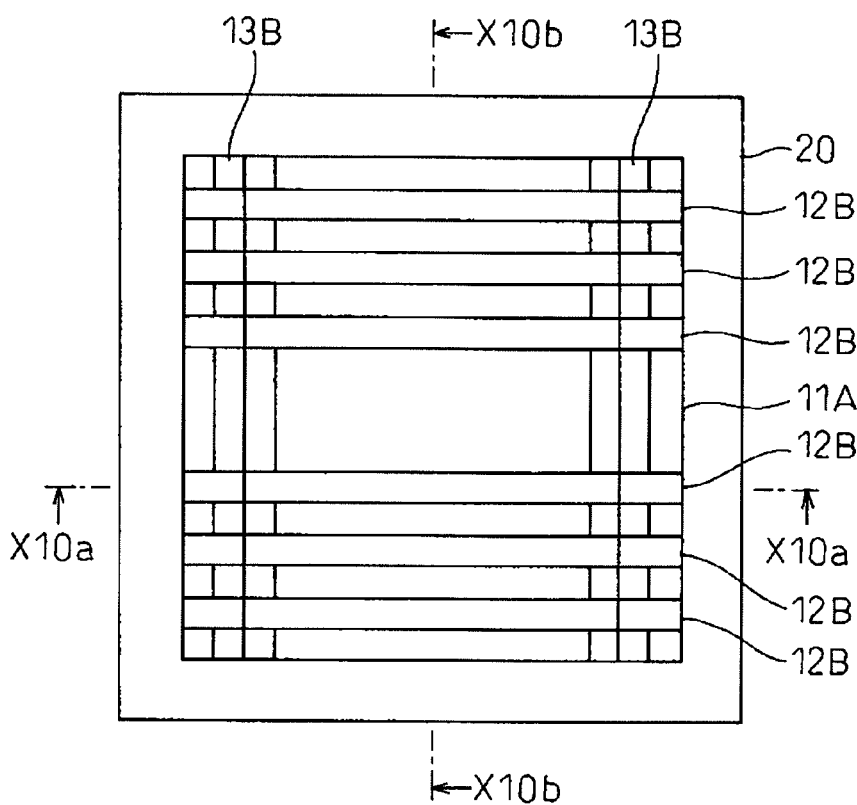
Figure 10C:
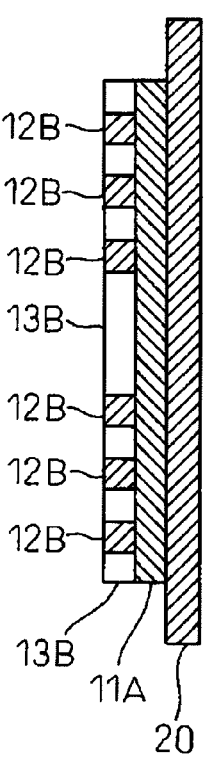
Figure 10B:
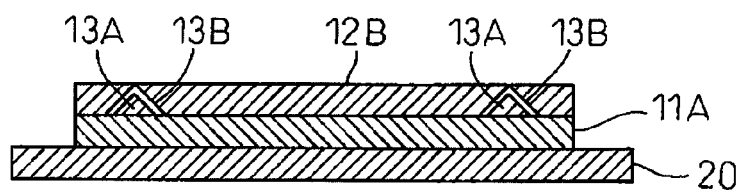

Then, as shown in FIGS. 10A-10C, the core sheet 12A is patterned through exposure to light and development, thereby forming long and narrow core portions 12B which are spaced from each other and are perpendicular to the pair of mirror support bundles 13A which are coated with the metal reflection films. The core layers 12 of the optical waveguide 10 will be formed from the core portions 12B.

In this embodiment, two sets of three parallel core portions 12B are formed so as to be spaced from and parallel with each other by the patterning the core sheet 12A. The core portions 12B are formed so as to be spaced from each other in the longitudinal direction of the pair of metal reflection bundles 13B and to go over the pair of metal reflection bundles 13B.

It is advantageous that the thickness of the core sheet 12A be designed so that the core sheet 12A has the same height as the pair of metal reflection bundles 13B after being sufficiently cured.

Then, as shown in FIGS. 11A-11C, a second cladding sheet 14A is formed on the core portions 12B and the first cladding sheet 12A so as to cover the core portions 12B. The second cladding layer 14 of the optical waveguide 10 will be formed from the second cladding sheet 14A.

As shown in FIG. 11B, the second cladding sheet 14A is formed on the core portions 12B in such a manner the bottom surface of the second cladding sheet 14A is in contact with the top of the metal reflection bundles 13B around which the interior angles 90° are formed.

In this embodiment, the second cladding sheet 14A is made of an unset light-curing resin or thermosetting resin and is sufficiently cured after being formed.

Figure 12A:
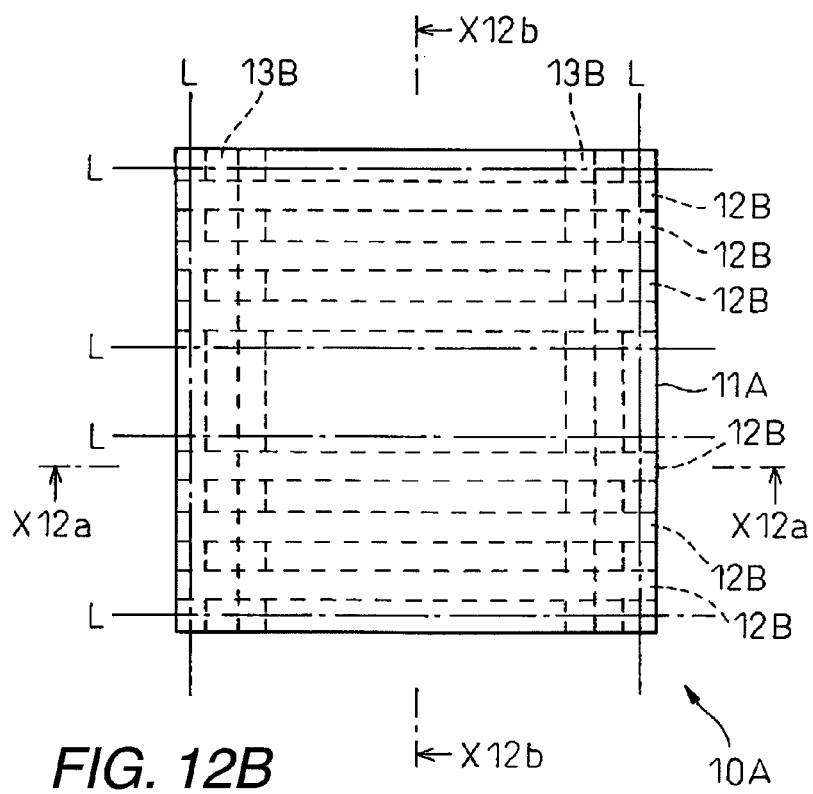
Figure 12C:
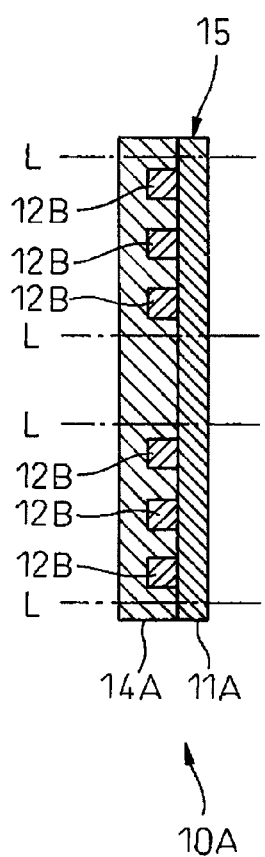
Figure 12B:
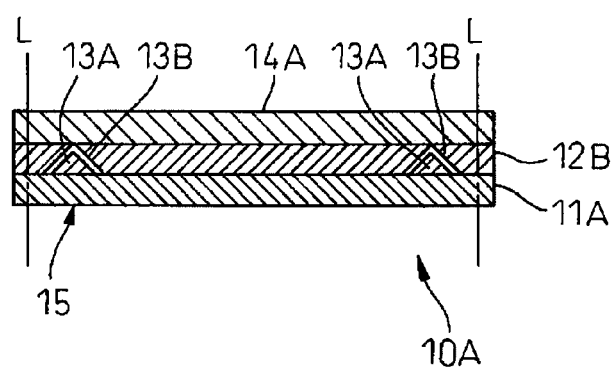

Then, as shown in FIGS. 12A-12C, the base substrate 20 is removed from the first cladding sheet 11A, whereby an optical waveguide bundle 10A is obtained in which the plural core portions 12B and the second cladding sheet 14A are formed on the first cladding sheet composite structure 15. Then, the optical waveguide bundle 10A is cut into individual optical waveguides 10 each of which includes a part of the pair of mirror support bundles 13A formed with the metal reflection films and at least one core portion 12B.

In this embodiment, as shown in FIGS. 12A-12C, the optical waveguide bundle 10A is cut along cutting lines L into two optical waveguides 10 as shown in FIGS. 1A-1C. In each optical waveguide 10, three core layers 12 which are formed with mirror portions 13 at both ends are spaced from each other and arranged parallel with each other.

In the manufacturing method of an optical waveguide according to the embodiment, the mirror portions 13 of the optical waveguide 10 can be formed with high accuracy using the flat die which has the pair of grooves 31. Since this manufacturing method employs the process of laminating resin sheets (what is called a film process) except in forming the mirror portions 13, this method facilitates manufacture and can reduce the manufacturing cost.

Furthermore, the die 30 for forming the mirror portions 13 can be made of a material that does not transmit ultraviolet light, the degree of freedom of the selection of a die material is high, which also contributes to the reduction of the manufacturing cost.

Next, a manufacturing method of an optical waveguide according to a second embodiment of the present invention will be described with reference to FIGS. 13A-16B. Unless otherwise specified, the above description of the manufacturing method according to the first embodiment is applicable in the following. In FIGS. 13A-16B, components having the same components in FIGS. 1A-12C are given the same reference symbols as the latter. This embodiment is directed to a manufacturing method of an optical waveguide to be provided on a circuit board.

First, a base substrate 20 and a flat die 30 are prepared. The base substrate 20 and the flat die 30 are the same as used in the first embodiment.

Figure 13A:
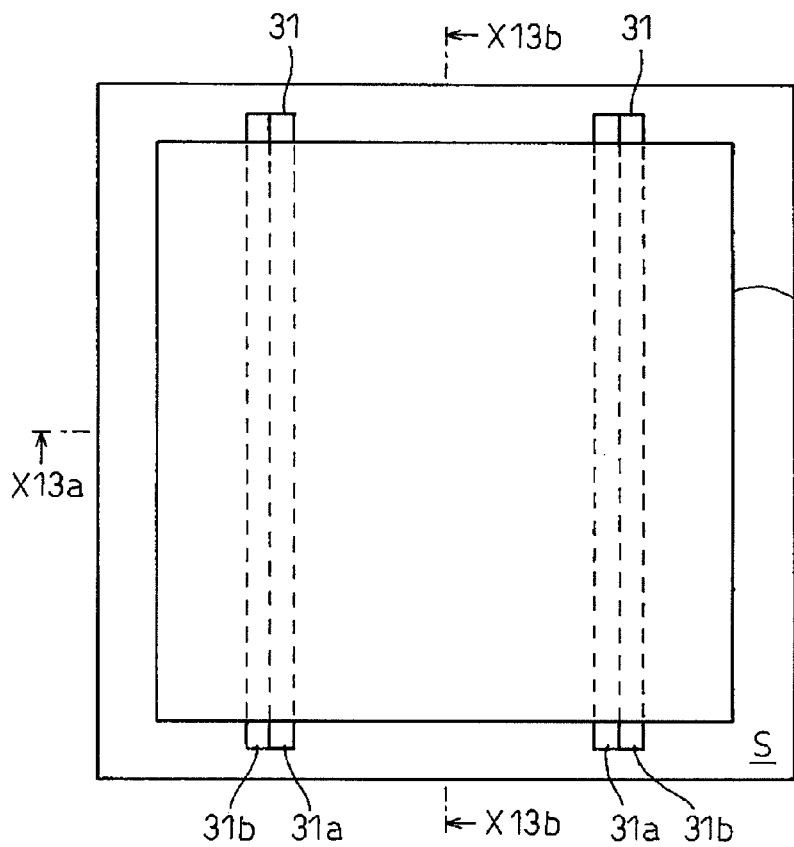
Figure 13C:
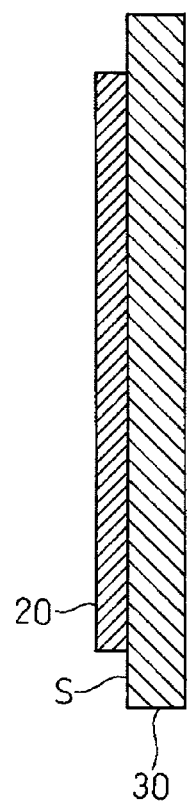
Figure 13B:
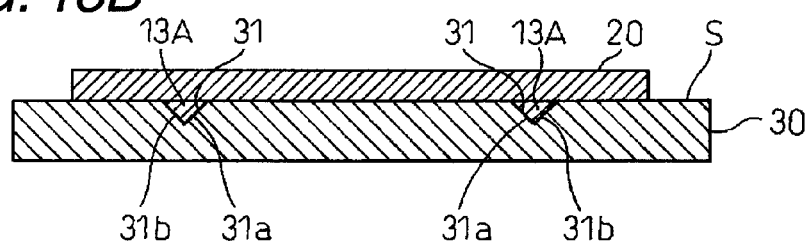

Then, as shown in FIGS. 13A-13C, the base substrate 20 is placed on one surface S of the flat die 30 so as to cover the pair of grooves 31. As the base substrate 20 is pressed against the flat die 30, liquid resin such as liquid light-curing resin or thermosetting resin is filled into each of the pair of grooves 31. Thus, a pair of mirror support bundles 13A are formed on the base substrate 20.

Then, the flat die 30 is removed from the pair of mirror support bundles 13A and the base substrate 20. Metal reflection films are formed on the pair of mirror support bundles 13A, whereby a pair of metal reflection bundles 13B are formed. A core sheet 12A is formed on the base substrate 20 so as to cover the pair of mirror support bundles 13A which are formed with the metal reflection films. Then, the core sheet 12A is patterned through exposure to light and development thereby forming a plural core portions 12B which are spaced from each other and are perpendicular to the pair of mirror support bundles 13A which are formed with the metal reflection films.

Figure 14A:
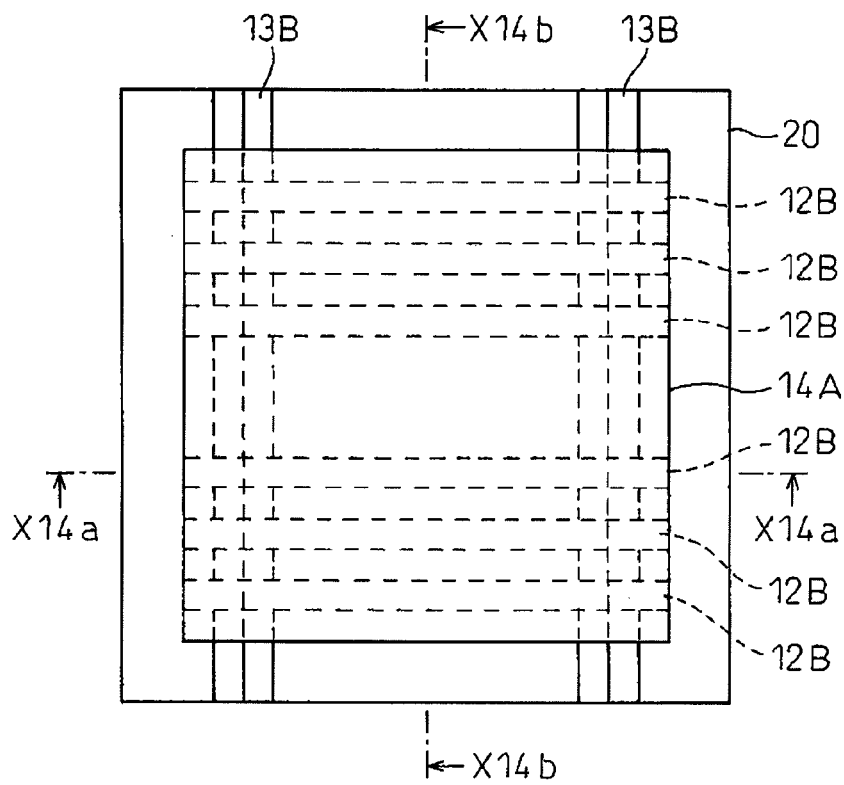
Figure 14C:
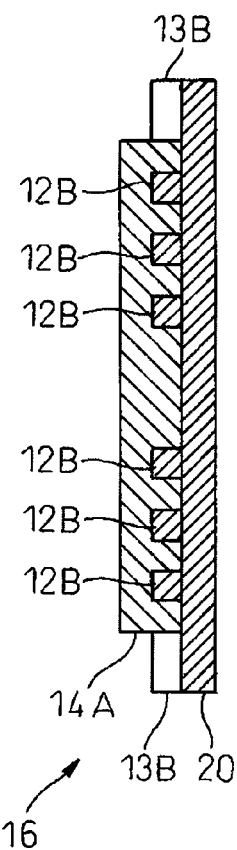
Figure 14B:
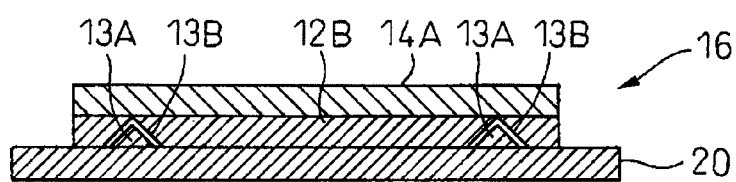

Then, as shown in FIGS. 14A-14C, a second cladding sheet 14A is formed on the core portions 12B so as to cover the core portions 12B. As a result, a core sheet composite structure 16 is formed which includes the second cladding sheet 14A, the plural core portions 12B, and the pair of mirror support bundles 13A formed with the metal reflection films. Those portions of the pair of mirror support bundles 13A which project from the second cladding sheet 14A are removed together with the metal reflection bundles 13B.

Then, the base substrate 20 is removed from the core sheet composite structure 16, whereby the pair of mirror support bundles 13A are exposed. The core sheet composite structure 16 from which the base substrate 20 has been removed is cut into individual optical waveguide precursors 10B each of which includes parts of the pair of mirror support bundles 13A formed with the metal reflection films and at least one core portion 12B (see FIGS. 15A-15C).

Figure 15A:
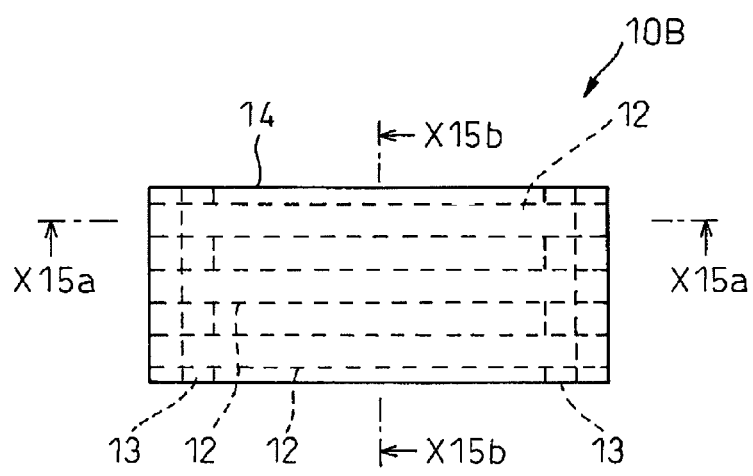
Figure 15C:
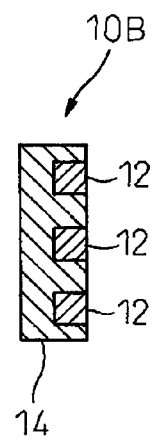
Figure 15B:
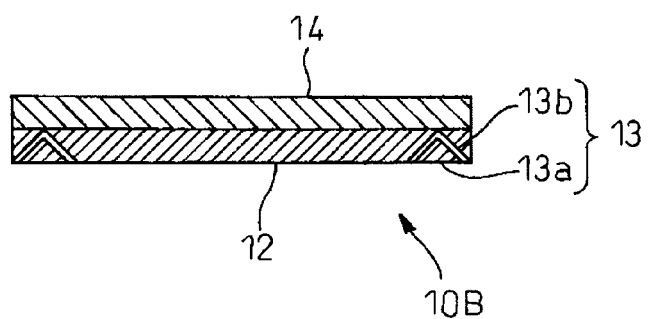

Each optical waveguide precursor 10B is obtained by removing the first cladding layer 11 from the optical waveguide 10 of FIGS. 1A-1C. As shown in FIG. 15B, the pair of mirror portions 13 are exposed in the bottom surface. The manufacturing process of an optical waveguide according to this embodiment is the same as the above-described manufacturing method according to the first embodiment except that the first cladding sheet 11A is not used.

Figure 16A:
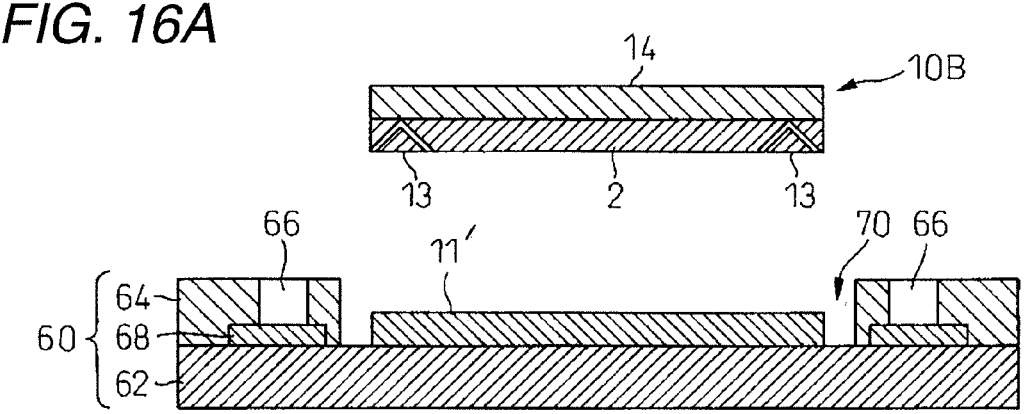

Subsequently, as shown in FIG. 16A, a circuit board 60 is prepared separately. The circuit board 60 is such that a solder resist layer 64 is formed on top of a multilayer wiring structure 62. The solder resist layer 64 has an opening 70 where an optical waveguide is to be mounted, and a part of the multilayer wiring structure 62 is exposed through the opening 70. The solder resist layer 64 also has openings 66 through which connection pads 68 are exposed, respectively.

Figure 16B:
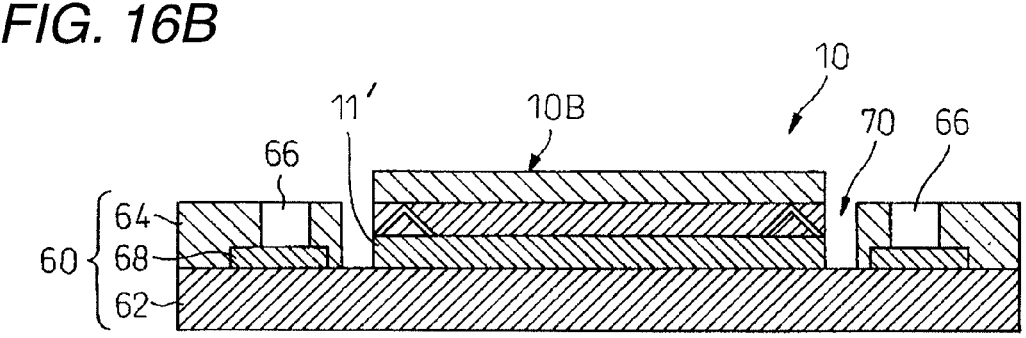

Then, as shown in FIG. 16B, a surface of the optical waveguide precursor 10B in which the pair of mirror portions 13 are exposed are bonded to a surface of the circuit board 60 which is located in the opening 70 via a bonding sheet 11' having a composition of a cladding sheet. When the optical waveguide precursor 10B is bonded to the circuit board 60, the bonding sheet 11' serves as the first cladding layer 11 of the optical waveguide 10.

The bonding sheet 11' may be a liquid adhesive having a composition of the first cladding layer 11 or a sheet having the same composition.

In the above-described manufacturing method of an optical waveguide according to this embodiment, the bonding sheet 11' is a liquid adhesive having a composition of the first cladding layer 11. This makes it possible to position the optical waveguide precursor 10B with respect to the circuit board 60 in a state that the optical waveguide precursor 10B is in contact with the adhesive That is, this makes it possible to bond the optical waveguide 10 to the circuit board 60 with high accuracy.

In particular, in connection with the positional relationships with a light-emitting element and a light-receiving element, the top surface of the optical waveguide 10 disposed on the circuit board 60 (i.e., the top surface of the second cladding layer 14) requires high positional accuracy in the height direction. According to the embodiment, the use of the bonding sheet 11' which is a liquid adhesive makes the height of the first cladding layer 11 adjustable and thereby makes it possible to adjust the height position of the top surface of the optical waveguide 10 (the top surface of the second cladding layer 14) with high positional accuracy by absorbing thickness variations of the related members.

Next, optical/electrical hybrid circuits in which an optical waveguide manufactured by the manufacturing method according to the present invention is mounted on a circuit board will be described.

EXAMPLE 1

Figure 17:
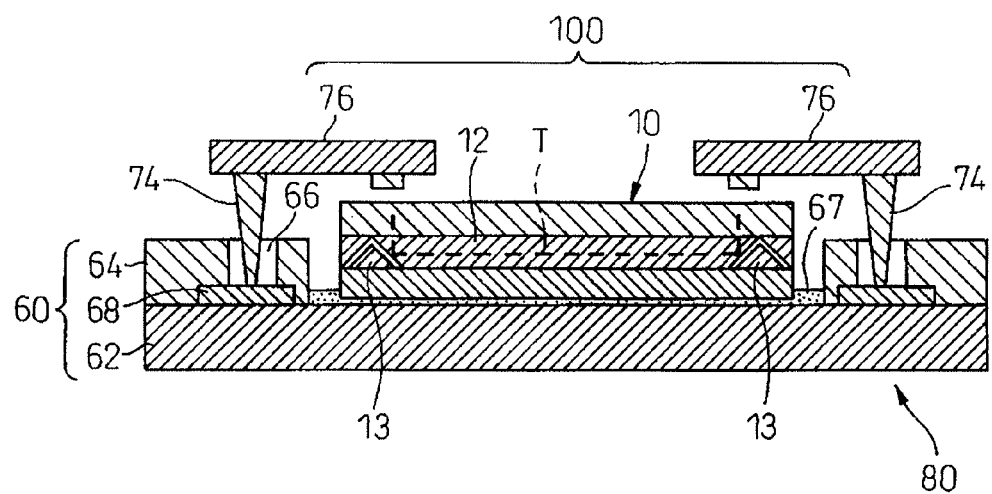
FIG. 17 shows an optical/electrical hybrid circuit which uses an optical waveguide that is manufactured by the manufacturing method according to the present invention.

FIG. 17 shows an optical/electrical hybrid circuit of Example 1. The optical/electrical hybrid circuit 80 shown in FIG. 17 is configured such that an optical waveguide 10 manufactured according to the first embodiment is bonded, via an adhesive 67, onto the surface of the circuit board 60 shown in FIGS. 16A and 16B, which is located in the opening 70. Light-emitting/receiving portions 76 are disposed, via bumps 74, over a pair of connection pads 68 which are located near both ends of the optical waveguide 10. The light-emitting/receiving portions 76 incorporate a light-emitting element such as a vertical cavity surface emitting laser (VCSEL) and a light-receiving element such as a photodiode (PD), respectively, and send/receive an optical signal. In this embodiment, the pair of light-emitting/receiving portions 76 and the optical waveguide 10 constitute an optical wiring 100. In the optical wiring 100, the core layer 12 of the optical waveguide 10 transmits an optical signal T between the light-emitting/receiving portions 76.

EXAMPLE 2

Figure 18:
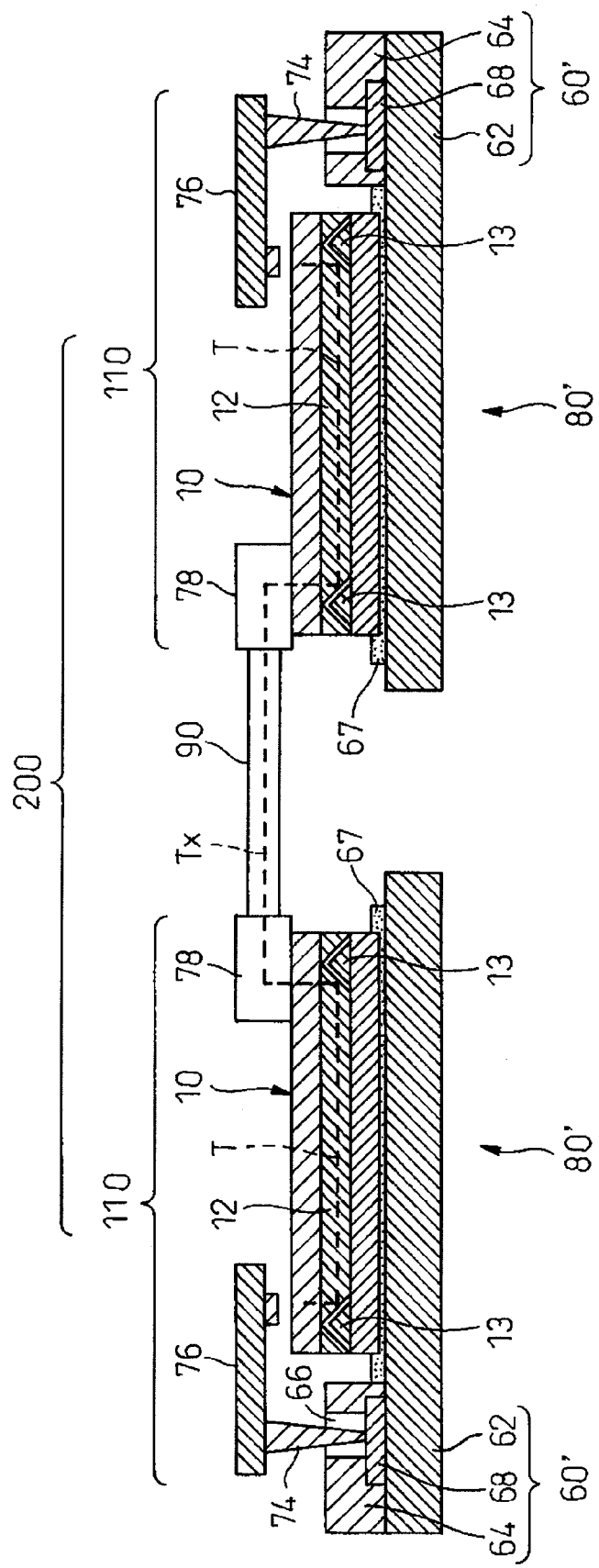
FIG. 18 shows an optical/electrical hybrid circuit which uses a pair of optical waveguides that are manufactured by the manufacturing method according to the present invention.

FIG. 18 shows an optical/electrical hybrid circuit of Example 2. In this Example, an optical wiring 200 is provided in which a pair of optical/electrical hybrid circuits 80' are connected to each other via an optical fiber 90. Each optical/electrical hybrid circuit 80' includes an optical waveguide 10 manufactured according to the first embodiment and a circuit board 60'.

The circuit board 60' of Example 2 is slightly different from the circuit board 60 of Example 1 in that a light-emitting/receiving portion 76 is disposed at only one end of the optical waveguide 10. An optical connector 78 which is optically jointed to the top surface of the second cladding layer 14 is disposed at the other end of the optical waveguide 10. One end portion of the optical fiber 90 is optically connected to the optical connector 78. The other end portion of the optical fiber 90 is optically connected to the optical connector 78 of the other circuit board 60'.

Each optical/electrical hybrid circuit 80' has an optical wiring 110 which is composed of the light-emitting/receiving portion 76, the optical waveguide 10, and the optical connector 78. The pair of optical wirings 110 and the optical fiber 90 constitute the optical wiring 200.

In the optical wiring 200, an optical signal Tx is transmitted between the pair of optical/electrical hybrid circuits 80' in such a manner as to be transmitted through the optical waveguide 10 of one optical wiring 110, the optical fiber 90, and the optical waveguide 10 of the other optical wiring 110 in this order.

In the optical/electrical hybrid circuits 80 and 80' of Examples 1 and 2, the optical waveguide 10 is manufactured according to the first embodiment. Alternatively, the optical waveguide 10 may be manufactured according to the second embodiment.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

For example, although in the first and second embodiments one optical waveguide 10 manufactured is provided with three core layers 12, an optical waveguide having two or more than three core layers 12 may be manufactured.

In the first and second embodiments, one optical waveguide 10 is provided with three core layers 12 and the manufacturing process is such that the optical waveguide bundle 10A or the core sheet composite structure 16 is cut into optical waveguides 10 or optical waveguide precursors 10B each which includes three core portions 12B. However, the present invention may provide a manufacturing method of an optical waveguide in which an optical waveguide has only one core layer and is formed without cutting an optical waveguide bundle 10A or a core sheet composite structure 16 in a manufacturing process. In this case, the first cladding sheet 11A corresponds to the first cladding layer 11, the core sheet 12A corresponds to the core layer 12, the pair of mirror support bundles 13A correspond to the pair of mirror supports 13a, the pair of metal reflection bundles 13B correspond to the pair of metal reflection portions 13b, and the second cladding sheet 14A corresponds to the second cladding layer 14.

In the optical waveguide 10 manufactured according to the first or second embodiment, each mirror portion 13 assumes an isosceles right triangle in a cross section taken perpendicularly to its longitudinal direction. However, the sectional shape of each mirror portion 13 may be a triangle, a rectangle, or a trapezoid as long as the metal reflection portion 13b has such an angle as to reflect light that is incident thereon externally so that the light comes to travel through the core layer 12 and such an angle as to output light that has traveled through the core layer 12 to the outside.

What is claimed is:
1. A method of manufacturing an optical waveguide using a flat die having a groove therein, the method comprising:
(a) forming a first cladding sheet on a base substrate;
(b) placing the first cladding sheet and the base substrate on the flat die such that the first cladding sheet faces the groove of the flat die and the groove of the flat die extends beyond side surfaces of the first cladding sheet;
(c) filling the groove with a liquid resin by injecting the liquid resin from an end portion of the groove that extends beyond one of the side surfaces of the first cladding sheet and then curing the liquid resin while pressing the base substrate against the flat die via the first cladding sheet, thereby forming a mirror support on the first cladding sheet;
(d) removing the flat die from the first cladding sheet;
(e) forming a mask on the first cladding sheet to cover the first cladding sheet with the mirror support exposed and forming a metal reflection film on a surface of the mirror support;
(f) forming a core sheet on the first cladding sheet such that the core sheet covers the mirror support that is formed with the metal reflection film;
(g) patterning the core sheet to form a plurality of core portions, the plurality of core portions being spaced from each other and being perpendicular to the mirror support;
(h) covering the core portions with a second cladding sheet;

(i) removing the base substrate from the first cladding sheet, thereby producing an optical waveguide bundle that includes the first cladding sheet, the plurality of core portions, the mirror support and the second cladding sheet; and (j) cutting the optical waveguide bundle into individual optical waveguides each including a part of the mirror support and at least one of the core portions.

2. The method according to claim 1, wherein, in step (c), the groove is filled with the liquid resin by capillary action.

3. The method according to claim 1, wherein the flat die is made of stainless steel.

4. The method according to claim 1, wherein the liquid resin is a light-curing resin or a thermosetting resin.

5. The method according to claim 1, wherein the first cladding sheet is made of a flexible unset light-curing resin or thermosetting resin.

6. The method according to claim 1, wherein the mirror support and the first cladding sheet are made of the same resin.

7. The method according to claim 1, wherein
the core sheet is made of an unset light-curing resin or thermosetting resin,
the core sheet covers the mirror support and the metal reflection film by a vacuum lamination method, and
the core sheet is flattened so as to have the same height as the mirror support with the metal reflection film.

8. A method of manufacturing an optical waveguide using a flat die having a groove therein, the method comprising:

(a) placing a base substrate on the flat die such that the base substrate faces the groove of the flat die and the groove of the flat die extends beyond side surfaces of the base substrate;

(b) filling the groove with a liquid resin by injecting the liquid resin from an end portion of the groove that extends beyond one of the side surfaces of the base substrate and then curing the liquid resin while pressing the base substrate against the flat die, thereby forming a mirror support on the base substrate;

(c) removing the flat die from the base substrate;

(d) forming a mask on the base substrate to cover the base substrate with the mirror support exposed and forming a metal reflection film on a surface of the mirror support;

(e) forming a core sheet on the base substrate such that the core sheet covers the mirror support that is formed with the metal reflection film;

(f) patterning the core sheet to form a plurality of core portions, the plurality of core portions being spaced from each other and being perpendicular to the mirror support;

(g) forming a first cladding sheet on the core sheet;

(h) removing the base substrate from the core sheet, thereby producing a core sheet composite structure that includes the first cladding sheet, the core sheet, and the mirror support;

(i) cutting the core sheet composite structure into individual optical waveguides each including a part of the mirror support and at least one of the core portions; and (j) bonding at least one of the individual optical waveguides onto a circuit board via a second cladding sheet such that the core portion faces the second cladding sheet.

* * * * *